United States Patent
Gladisch et al.

(10) Patent No.: US 12,505,080 B2
(45) Date of Patent: Dec. 23, 2025

(54) METHOD FOR ENSURING A QUALITY OF SYNTHETIC DATA FOR AT LEAST ONE PERCEPTION FUNCTION USING A DISTRIBUTED SYSTEM

(71) Applicant: Robert Bosch GmbH, Stuttgart (DE)

(72) Inventors: Christoph Gladisch, Renningen (DE); Falko Matern, Erlangen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/885,677

(22) Filed: Sep. 15, 2024

(65) Prior Publication Data

US 2025/0103567 A1 Mar. 27, 2025

(30) Foreign Application Priority Data

Sep. 26, 2023 (DE) ...................... 10 2023 209 405.3

(51) Int. Cl.
*G06F 16/215* (2019.01)
(52) U.S. Cl.
CPC .................................. *G06F 16/215* (2019.01)
(58) Field of Classification Search
None
See application file for complete search history.

(56) References Cited

U.S. PATENT DOCUMENTS

2022/0189145 A1* 6/2022 Evans ................. G06V 10/776
2023/0015989 A1* 1/2023 Yu .......................... G06V 10/44

OTHER PUBLICATIONS

Abrecht et al., "Testing Deep Learning-based Visual Perception for Automated Driving", ACM Transactions on Cyber-Physical Systems, Sep. 2021, vol. 5, Issue No. 4, Article No. 37, pp. 1-28, Association for Computing Machinery, https://doi.org/10.1145/3450356.

* cited by examiner

*Primary Examiner* — Richard L Bowen
(74) *Attorney, Agent, or Firm* — Maginot, Moore & Beck LLP

(57) ABSTRACT

A method for ensuring a quality of synthetic data for at least one perception function using a distributed system includes (i) providing at least one interface of the distributed system in order as to provide access from at least two instances of the distributed system to an evaluation component of the distributed system by the at least one interface, (ii) determining an application for the synthetic data by one of the at least two instances of the distributed system, wherein the application includes at least the at least one perception function, a description of the synthetic data, and at least one metric for evaluating the quality of the synthetic data, (iii) generating the synthetic data based on the described application by the one or another of the at least two instances of the distributed system, and (iv) evaluating the synthetic data with respect to reference data using the at least one metric by the evaluation component of the distributed system to ensure the quality of the synthetic data. Also disclosed is a computer program, a device and a storage medium for this purpose.

9 Claims, 4 Drawing Sheets

METHOD FOR ENSURING A QUALITY OF SYNTHETIC DATA FOR AT LEAST ONE PERCEPTION FUNCTION USING A DISTRIBUTED SYSTEM

This application claims priority under 35 U.S.C. § 119 to patent application no. DE 10 2023 209 405.3, filed on Sep. 26, 2023 in Germany, the disclosure of which is incorporated herein by reference in its entirety.

The disclosure relates to a method for ensuring a quality of synthetic data for at least one perception function using a distributed system. The disclosure also relates to a computer program, a device and a storage medium for this purpose.

BACKGROUND

There are various examples of methods for referenced comparison of images and evaluating image data in the prior art. In particular, these often focus on quantifying a similarity between two images, e.g. compressed and uncompressed, in relation to human perception, i.e. how much people notice compression artefacts, for example. There are also examples of methods for evaluating synthetic data, which have been rendered, for example, by a simulation tool or generated by Generative Adversarial Network (GAN) methods. Here, the focus is in particular on a direct comparison of data, e.g., real and synthetic, with corresponding metrics, e.g. FID, in order to generate metrics for comparing different methods.

Furthermore, in particular, there are methods that use computer vision methods (e.g., semantic segmentation) to compare real and synthetic images in order to evaluate a suitability of the data for specific methods. However, in order to apply these methods, the appropriate computer vision algorithm must be selected, implemented, applied to suitable data corresponding to a specific application and evaluated. This can be done individually on the part of the user of the data.

Development and verification of perception functions such as deep neural network-based computer vision preferably requires annotated image data or video. For example, the sub-areas of computer vision include a reconstruction of scenes, a detection of objects, a detection of events, a detection of activities, video tracking, an object detection, 3D position estimation, a motion estimation and 3D scene modelling. There are also different types of tools for creating synthetic image data, images, or videos. One problem in particular is the evaluation of the quality and suitability of these data for training or testing in terms of the perception function. The problem of adequately and efficiently evaluating the data and tools affects, for example, both providers of the tools or the data as well as users of these tools or consumers of the data. The quality of the synthetic data must preferably be sufficiently good so that the data can be used for training or testing a perception function designed for real data. Checking the quality has so far been very complex, which often limits or prevents the usability of synthetic data or generation tools.

The general suitability of synthetic data or the synthesis tool for training or testing the perception function can be questionable. This can create a cost/benefit risk for a developer or tester of the perception function, such that the methodology of using synthetic data for training or testing DNN-based perception is often not used.

The evaluation of the data or a tool by the user or data consumers usually takes place individually, qualitatively and manually. A great deal of effort can therefore often be necessary to arrive at a quantitative evaluation in experiments.

So far, for example, isolated solutions for data, models, tool chains and experiments have been generated. However, due to the complexity of these components, interfaces and manual steps, the iterations can be too slow, too inefficient, and too complex to achieve an economical and scalable way of working and thus predictable and continuous business relationships between data and tool developers and their users in perception development.

SUMMARY

The subject matter of the disclosure is a method with the features described herein, a computer program with the features described herein, a device with the features described herein and a computer-readable storage medium with the features described herein. Further features and details of the disclosure will emerge from the description and the drawings. Features and details which are described in connection with the method according to the disclosure naturally also apply in connection with the computer program according to the disclosure, the device according to the disclosure and the computer-readable storage medium according to the disclosure, and vice versa in each case, so that reference is or can always be made to the individual aspects set forth in the disclosure.

The object of the disclosure is in particular a method for ensuring a quality of synthetic data for at least one perception function using a distributed system comprising the steps of:

providing at least one interface of the distributed system in order to provide access from at least two instances of the distributed system to an evaluation component of the distributed system by the at least one interface, determining an application for the synthetic data by one of the at least two instances of the distributed system, wherein the application comprises at least the at least one perception function, a description of the synthetic data, and at least one metric for evaluating the quality of the synthetic data, generating the synthetic data based on the described application by the one or another of the at least two instances of the distributed system, evaluating the synthetic data with respect to reference data using the at least one metric by the evaluation component of the distributed system to ensure the quality of the synthetic data.

Synthetic data in the context of the present disclosure is in particular reproduced or simulated data of a sensor or a camera. The interface can be provided as a wired or wireless interface, for example for connection via the Internet. The instances can be a respective data processing device or a respective user, or a user role, respectively, wherein it is also contemplated that multiple users, i.e. in particular multiple instances, use a same data processing device. For example, an instance with a data processing device can describe the application and another instance with the same or a further data processing device can generate the synthetic data. For example, by defining the application, at least one perception function can be selected for detecting traffic signals and, correspondingly, the synthetic data and the reference data can in this case comprise different traffic signals in traffic scenes. The reference data can be real data resulting, for example, from a recording of a sensor or camera. For example, the at least one metric can be based on a direct comparison between the synthetic data and the reference data, for example, by a pixel-by-pixel comparison. The synthetic data can be generated by a tool, wherein the tool can be a rendering tool or an augmentation tool or a machine learning model or a neural network, for example. The generation can be based on at least a portion of the reference data. It can further be contemplated that further reference data are recorded based on the evaluation of the synthetic data. The reference data can be provided and/or recorded by one of the at least two instances. The quality of the synthetic data can be assured if the at least one metric does not exceed a defined limit value. The method advantageously enables faster iteration cycles to improve or ensure the quality of the synthetic data, as well as cooperation and an exchange of knowledge between different users of the distributed system, among other things. Advantageously, the distributed system can enable cooperation between different instances without the need for disclosure of technologies (e.g., perception function, synthetic data generation tool), "know-how" and intellectual property of a respective instance.

It can further be possible that the method further comprises the step of:
  adjusting the generation by the one or another of the at least two instances of the distributed system based on a result of the evaluation.

For example, as part of the adjustment, the synthetic data and/or a tool used to generate the synthetic data is altered. As a result, an improvement in the sense of an approximation of the synthetic data to the reference data can advantageously take place. It can be contemplated that adjusting the generation and the evaluation of the synthetic data with respect to the reference data is performed as often as necessary until the result of the evaluation indicates that the quality of the synthetic data is sufficient. Preferably, generating and adjusting the generation is performed by the same instance.

Preferably, the disclosure can provide that adjusting the generation comprises the following step:
  varying at least one parameter of a tool, wherein the tool is configured to generate the synthetic data,
  generating the synthetic data based on the described application using the tool.

For example, the tool can be a rendering tool or an augmentation tool or a machine learning model or neural network. An automated optimization of the tool can be provided, wherein varying the at least one parameter of the tool and evaluating the synthetic data with respect to the reference data is repeated in succession until the quality of the synthetic data is ensured.

It is also advantageous if the evaluation comprises the following step:
  comparing a similarity between the synthetic data and the reference data to provide a first metric of the at least one metric.

To compare the similarity between the synthetic data and the reference data, a plurality of metrics or comparison methods can be used. These can be derived, for example, from established procedures, e.g. examination of compression algorithms or developed specifically for the application. The comparison can take place at different granularity levels with respect to the synthetic data and reference data. For example, complete data sets or sub-data sets can be compared as distributions of characteristics, features or metric values. Furthermore, individual paired images from the synthetic and reference data, paired image portions, or semantic image regions, e.g., a person or vehicle, can be compared. The methods used for comparison at different granularity levels can be based on, for example, a pixel-by-pixel comparison, comparison of features or image properties in a local neighborhood, comparison of feature spaces, latent spaces of convolutional neural networks or feature embeddings, e.g. CLIP embedding. Machine learning models trained specifically for this comparison are also contemplated.

In another possibility, it can be provided that the evaluation comprises the following step:
  performing the at least one perception function, each using the synthetic data and the reference data,
  comparing a result of the respective execution to provide a second metric of the at least one metric.

As a result, an evaluation with respect to a target application of the at least one perception function can be advantageously carried out. Preferably, the at least one perception function is performed to provide a prediction. The respective predictions of the at least one perception function based on the synthetic data and the reference data can be the result of the respective execution and be compared to provide the second metric of the at least one metric.

According to a further advantage, it can be provided that communication between the at least two instances and/or a configuration of the application and/or the at least one perception function and/or the at least one metric is provided by the at least one interface. This advantageously allows distributed processing by different users, which can accelerate the improvement of the synthetic data based on the evaluation. For example, the at least one interface can be used for communication and processing via a cloud-based solution.

In addition, it is advantageous in the context of the disclosure if the synthetic data simulate sensor data and/or image data and/or for the reference data result from a measurement of at least one sensor, in particular a recording of at least one camera, and/or the at least one perception function is an image classification function of a machine learning model.

It is possible that the at least one perception function can be used on a vehicle. The vehicle can, for example, be designed as a motor vehicle and/or a passenger vehicle and/or an autonomous vehicle. The vehicle can comprise a vehicle device, e.g., for providing an autonomous driving function and/or a driver assistance system. The vehicle device can be designed to control and/or accelerate and/or brake and/or steer the vehicle, at least partially automatically on the basis of the at least one perception function.

The synthetic data and/or the reference data may, for example, comprise image data resulting from recording with a camera sensor. Here, the values of image points, preferably pixels, of the image data can be used to represent an environment and/or a traffic scene. Classification and preferably image classification based on these values can be used to detect objects in the surrounding environment and/or traffic scene. The classification and image classification can also be provided in the form of semantic segmentation (i.e., pixel-by-pixel or area-by-area classification) and/or object detection. The image data can be images of a radar sensor and/or an ultrasonic sensor and/or a LiDAR sensor and/or a thermal imaging camera for example. Accordingly, the images can also be configured as radar images and/or ultrasonic images and/or thermal images and/or lidar images.

Another object of the disclosure is a computer program, in particular a computer program product, comprising instructions which, when the computer program is executed by a computer, cause the computer to carry out the method according to the disclosure. The computer program according to the disclosure thus brings with it the same advantages as have been described in detail with reference to a method according to the disclosure.

The disclosure also relates to a device for data processing which is configured to carry out the method according to the disclosure. The device can be a computer, for example, that executes the computer program according to the disclosure. The computer can comprise at least one processor for executing the computer program. A non-volatile data memory can be provided as well, in which the computer program can be stored and from which the computer program can be read by the processor for execution.

The disclosure can also relate to a computer-readable storage medium, which comprises the computer program according to the disclosure and/or comprises instructions that, when executed by a computer, prompt said computer program to carry out the method according to the disclosure. The storage medium is configured as a data memory such as a hard drive and/or a non-volatile memory and/or a memory card, for example. The storage medium can, for example, be integrated into the computer.

In addition, the method according to the disclosure can also be designed as a computer-implemented method.

BRIEF DESCRIPTION OF THE DRAWINGS

Further advantages, features and details of the disclosure will emerge from the following description, in which exemplary embodiments of the disclosure are described in detail with reference to the drawings. The features mentioned in the claims and in the description can each be essential to the disclosure individually or in any combination. Shown are:

DETAILED DESCRIPTION

Figure 1:
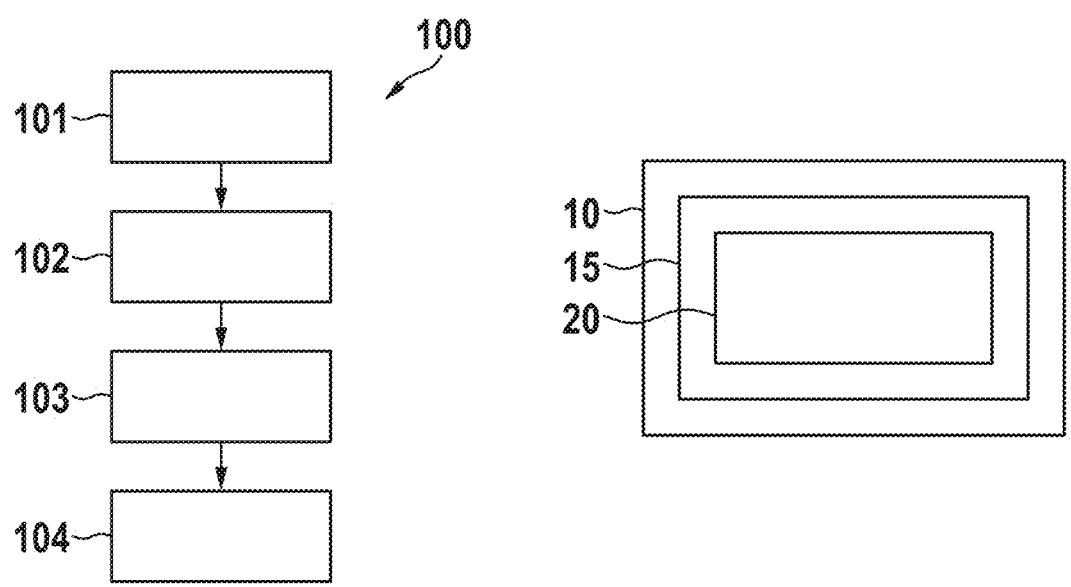
FIG. 1 a schematic visualization of a method, a device, a storage medium, and a computer program according to exemplary embodiments of the disclosure, FIG. 2 a schematic illustration of an evaluation unit according to exemplary embodiments of the disclosure, FIG. 3 a schematic illustration of a technical structure for a method according to exemplary embodiments of the disclosure, FIG. 4 a schematic illustration of a distributed system according to exemplary embodiments of the disclosure.

FIG. 1 schematically illustrates a method 100, a device 10, a storage medium 15 and a computer program 20 according to exemplary embodiments of the disclosure.

FIG. 1 shows in particular an exemplary embodiment for a method 100 for ensuring a quality of synthetic data 5 for at least one perception function 7 using a distributed system 1000. In a first step 101, at least one interface 21, 22, 23, 24 of the distributed system 1000 is provided to provide access from at least two instances 30, 40, 50 of the distributed system 1000 to an evaluation component 1 of the distributed system 1000 by the at least one interface 21, 22, 23, 24. In a second step 102, an application 31 for the synthetic data 5 is defined by one of the at least two instances 30, 40, 50 of the distributed system 1000. The application 31 comprises at least the at least one perception function 7, a description of the synthetic data 5 and at least one metric for the evaluation of the quality of the synthetic data 5. In a third step 103, the synthetic data 5 is generated based on the described application 31 by the one or another of the at least two instances 30, 40, 50 of the distributed system 1000. In a fourth step 104, the synthetic data 5 is evaluated with respect to reference data 4 using the at least one metric by the evaluation component 1 of the distributed system 1000 to ensure the quality of the synthetic data 5.

According to exemplary embodiments, this disclosure evaluates the quality of synthetic sensor data, for example image or video data, or the synthesis tool, for the training or testing of at least one perception function 7, which is to be applied to real data. For example, the disclosure describes a software technical concept for enabling simple adaptation and execution of the method of comparison, integration of data and perception functions 7, rapid iterations and feedback in the development of synthetic data 5, and by summing these advantages, novel cooperative operations. This concept allows tasks to be distributed differently, for example, a data or tool provider can advantageously work more autonomously and more efficiently.

For example, advantages of the disclosure according to exemplary embodiments are that application complexity is reduced for users, that rapid iteration cycles and flexibility in applying the evaluation are enabled, and that cooperation and knowledge sharing is encouraged between different users.

According to exemplary embodiments, this disclosure describes a specific validation software/architecture/platform for synthetic image and video data, for example a camera, radar or lidar for the development or testing of perceptual functions, in particular DNN-based perception functions.

The disclosure according to exemplary embodiments automates complex experiments and qualitative evaluation, and in particular allows for an iterative improvement and evaluation process between a data or tool customer and a corresponding supplier.

The disclosure according to exemplary embodiments may further enable the data/tool supplier to obtain quick and automatic feedback during development of the data/tool to improve the data or tool.

The disclosure according to exemplary embodiments can be used as a communication basis between the data/tool supplier and the consumer by documenting and exchanging the state of development of data quality and tool functions. The disclosure according to exemplary embodiments can be used as a tracking tool for the current state of development of the synthetic data.

The disclosure can further enable agile work. In agreement with the data/tool supplier, the customer can further update the perception function or the deep neural network or modify evaluation criteria. The new evaluation criteria or the perception function can be immediately available to the data/tool developer for automated evaluation.

The disclosure according to exemplary embodiments can allow a design studio or data provider to plan and perform the required reference data or real data recordings and other measurements themselves, so that these optimally match the workflow and tooling of the design studio. This allows the design studio to work more flexibly, more effectively, and more efficiently, and achieve better results faster.

The disclosure according to exemplary embodiments can further enable continuous processes and business relationships, and thus scaling. The disclosure standardizes, automates and supports the data/modelling/tool development process as a communication basis in particular, and preferably allows continuity for processes and business relationships.

Preferably, the disclosure according to exemplary embodiments compares a synthetic image from synthetic data 5 with a real image from reference data 4 in terms of a prediction quality of a machine learning model or a perception function and can allow the parameters of the data generation tool to be determined in order to obtain a better match between real, or reference data 4, and synthetic data 5.

The disclosure according to exemplary embodiments describes a software system that allows an automated evaluation of the quality and suitability of the synthetic data 5 for specific applications, both for data providers and consumers of the synthetic data 5.

Requirements and prerequisites for data production that are required for defined use cases can be managed for this purpose. Furthermore, real data can be provided as reference data 4 or can be specifically generated. Furthermore, synthetic data 5 representing the reference data 4 as a twin can be generated by a simulation tool or provider. In addition, reference data 4 and synthetic data 5 can be automatically compared and evaluated by a software component using suitable methods. In addition, the automated evaluation and assessment can be used for the suitability test and iterative improvement of the simulation.

For example, the disclosure according to exemplary embodiments is a technical framework for evaluating and iteratively improving synthetic sensor data (e.g., image/video data) that is to be used for testing or training of perception functions 7 (e.g., based on neural networks, deep learning, AI methods). The synthetic data 5 can be generated, for example, by generative AI methods (e.g. GAN, diffusion), rendering or ray tracing methods from computer graphics or by augmentation methods. One goal can be to ensure the quality of synthetic data 5 for an application, e.g., validating and testing, and to enable efficient collaboration between users (e.g., data consumers and data providers).

The description below includes a basic mathematical principle for the evaluation, a technical structure and an interaction scheme that shows how different people and organizations can interact according to a role distribution.

Figure 2:
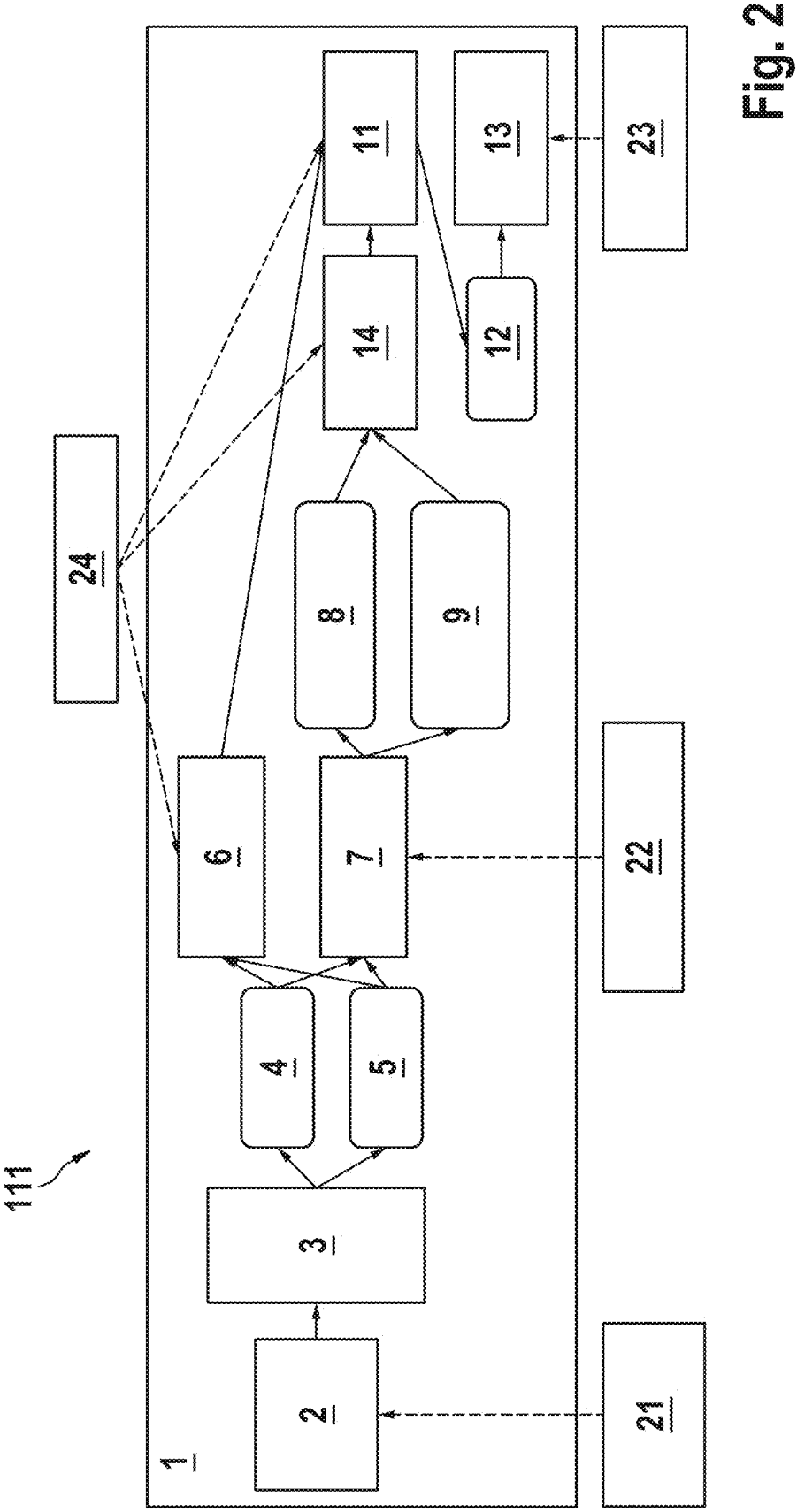

An evaluation unit 111 according to exemplary embodiments includes an evaluation component 1 and various interfaces 21, 22, 23, 24. According to the exemplary embodiment in FIG. 2, the evaluation unit 111 comprises in particular a sequence of functions and methods 2, 3, 6, 7, 14, 11, 13, which can be flexibly exchanged and extended in the form of plugins, and are used in particular to compare reference data 4 and synthetic data 5, and to evaluate the quality based on this comparison. A comparison of synthetic data 5 and reference data 4, both in referenced form (direct comparison) 6, and in relation to an output of the computer vision (CV) functions, wherein the computer vision functions according to advantageous exemplary embodiments are, for example, perception functions 7, is preferably carried out by their application. The selection and configuration of the plugins and the retrieval of results and visualizations can be carried out via various interfaces 21, 21, 22, 24.

The evaluation procedure according to exemplary embodiments can be performed as follows.

Data from different domains (e.g., real and synthetic) for different applications (e.g., object detection or traffic sign detection) can have different data structures and annotation formats. These data sets can be loaded using suitable data loaders 2, which are implemented in the form of plugins. The data loaders 2 preferably load the sensor data or image data, ground truth data, and other attributes that characterize the sensor data. The data loader 2 and selection of the data can be controlled by an associated interface 21.

The data is preferably pre-processed by way of pre-processing plugins 3 for the comparison and application (e.g. normalization for a computer vision function) and aligned with one another (e.g. temporal synchronization of the data, geometric registration or assignment with regard to different attributes and parameters).

The loaded and pre-processed reference data 4 and synthetic data 5 serve in particular as input for the referenced comparison 6 and for the application of relevant computer vision (CV) functions or the perception functions 7.

Both the metrics for the referenced comparison and the evaluation of results of the execution of computer vision functions, in particular perception functions 7, can be flexibly implemented by plugins 6, 14 and thus adapted for specific applications. The selection and configuration of the plugins 6 and 7 is preferably carried out via corresponding interfaces 22 and 24.

For direct comparison 6 between reference data 4 and synthetic data 5, a plurality of metrics or comparison methods can be applied. These can be derived, for example, from established procedures, (e.g. examination of compression algorithms) or developed specifically for the application. The referenced comparison between reference data 4 and synthetic data 5 can take place at different granularity levels with respect to the data. That is to say, complete data sets/part data sets can be compared as distributions of properties, characteristics, or metric values, for example. Furthermore, individual paired images (e.g., taken from the reference data/synthetic data) or paired image portions or semantic image areas (e.g., person, vehicle, etc.) can be compared. The methods used for comparison at different granularity levels can be based on, for example, a pixel-by-pixel comparison, comparison of features/image properties in a local neighborhood, comparison of feature spaces, latent spaces of CNNs, feature embeddings, (e.g. CLIP embedding). Similarly, trained AI methods are conceivable from data specifically for this comparison.

The perception or computer vision functions 7 can be applied to both the reference data 4 and the corresponding synthetic data 5 to evaluate the data with respect to the target application. The result of the computer vision function for each data domain 8, 9 (i.e. one result when applied to reference data 8 and one result when applied to synthetic data 9) is preferably used as input for a component implemented as a plugin for comparing the results 14, which can be configured by an interface 24. The comparison of the respective predictions by the perception function 7 can take place in an application-specific or domain-specific manner. The comparison 14 measures in particular the extent to which the synthetic data 5 lead to the same positive and negative cases as reference data 4 with regard to the perception function 7. Specific metrics and procedures can be used for this purpose, i.e., in particular, established evaluation methods are used for the respective type of computer vision function, or perception function 7, but the evaluation preferably takes place for the reference data 4/synthetic data 5 pairing. For example, in the event of object detection using bounding boxes, the predicted boxes for a real image of the reference data 4 can be compared with the predicted boxes for the synthetic image of the synthetic data 5. For bounding boxes, e.g. by matching the boxes (reference data to synthetic) and calculating the Intersection-over-Union (IoU) or number of matches. For other applications/CV functions, such as optical flow, for example, angular errors or end point errors can be calculated between the output of a method for estimating the optical flow for reference data 4 and synthetic data 5.

The calculated metrics and comparisons from the components 6 and 14, as well as any interim results, are preferably fed to quality evaluation plugins 11 that can be configured by the metrics and evaluation interface 24. For example, these plugins 11 evaluate the similarity of the respective predictions 14 of the perception or computer vision function 7, taking into account the similarity based on the direct comparison 6 of the synthetic data 5 and reference data 4. For very similar pairs of images (each of the reference data 4 and synthetic data 5), it can be expected that the predictions are similar or identical. Based on the calculated metrics and results, failure cases (such as a poor match between reference data and synthetic data) can also be detected, quantified and evaluated and correlations between image properties, metrics and deviations in the perception or computer vision function 7 can be correlated and quantified. Technically, an aggregation of the metrics calculated by the components 6 and 14 for different levels of granularity (e.g., data set, single image, image portion, object in the image) and all attributes/parameters characterizing the synthetic and reference data can also take place in a suitable data structure 12.

The results 12 of quality evaluation 11 can be translated into suitable graphical evaluations by visualization plugins 13. For example, the results, interim results, and visualizations can be made available via an interface 23.

Figure 3:
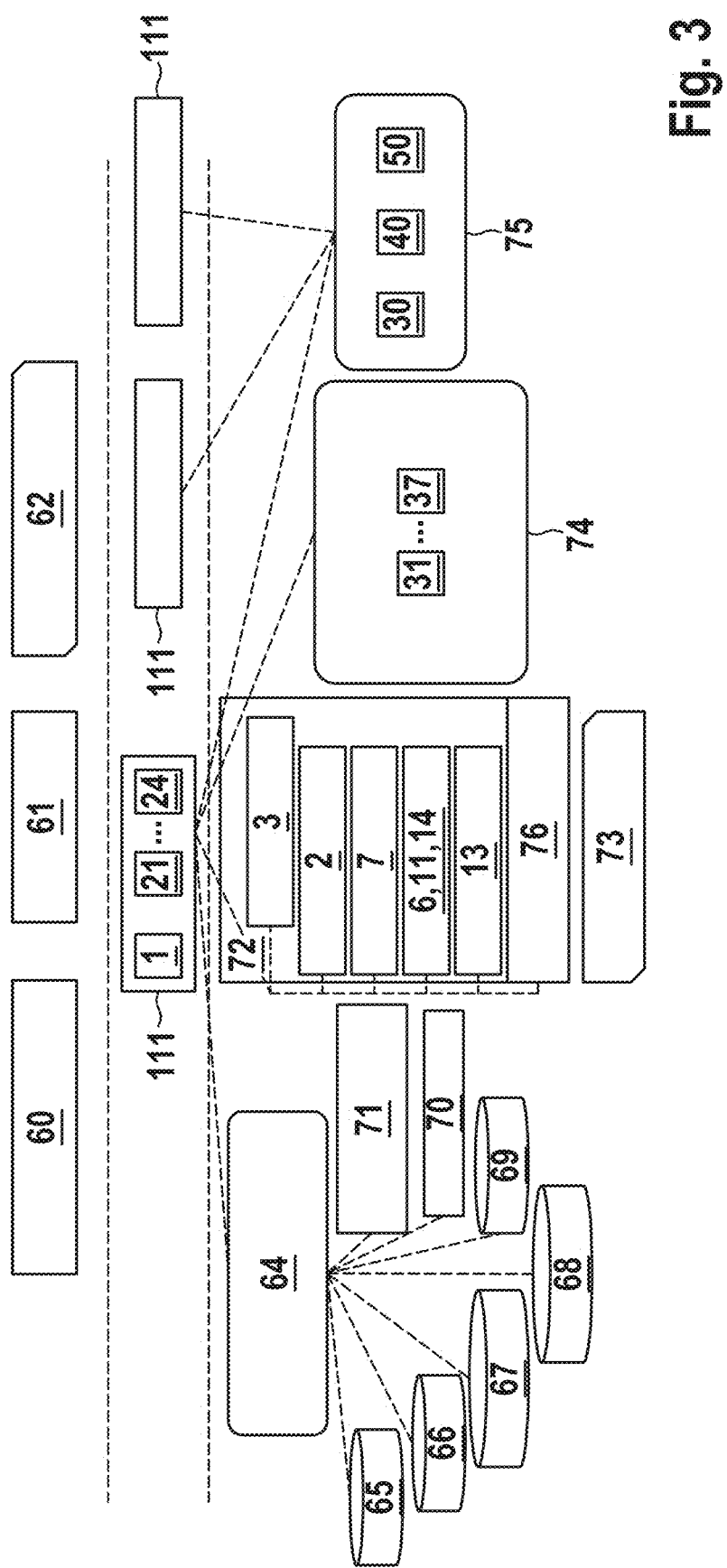

In accordance with exemplary embodiments of the disclosure, a technical structure according to the exemplary embodiment is further described in FIG. 3, which depicts interfaces, configurations and technical components. This structure allows in particular a plurality of users 75, or cooperation partners, to perform instantiations of an evaluation unit 111, each comprising an evaluation component 1 and interfaces 21, 22, 23, 24 (abbreviated as 21-24 in FIG. 3 for the sake of clarity), and to interact with each other via user interfaces 60-62. The evaluation unit 111 allows users 75 to work on shared resources 65-70 and applications cases 74 via a configuration 64. The evaluation unit 111 can be adapted to the technical requirements of various applications by programming plugins 72 using the open source API 73, which are loaded by the evaluation components 1 at startup.

To prepare one or more instances of the evaluation unit 111, the users 75 can define and prepare local data stores 65-69, computer resources (incl. GPU, server, etc.) 70, 71, users and access rights, and agree on where which data is located and where which processes are executed. The information on data and computing resources is in particular exchanged between the users 75 and the users 75 define the configuration file 64 for their respective evaluation components 1. The resources 65-71 can be internal or external to one user 75, such as a data consumer 30, a synthetic data and/or tool supplier 50, or a reference data supplier 40, and vice versa for the other user 75. For example, the local memory of user A can be an external memory for user B, as well as for computing resources. Where appropriate, data stores and computing resources 65-71 can be provided by a cloud operator and used by the users 75.

Access and execution testing can then be performed. The evaluation units 111 now preferably have access to the local and external data repositories and the ability to perform processes locally or externally.

A user 75 can perform instantiation of the evaluation unit 111 as web a server 60, as a CLI or GUI application 61, or in a programming language as API 62.

When an evaluation unit 111 is started, the plugins 72 are preferably loaded, which can be programmed via the open source API 73. The plugins can operate programming interfaces that are expected by the evaluation unit 111 and access the data and computer resources 65, 66.

In particular, data loader plugins 2 access the memory 65, 66 for synthetic data 5 and reference data 4. The dataloader plugins 2 can implement the virtual generation of subsets and subsamplings to generate virtual partial data sets according to certain criteria. Different data subsets and data sampling methods can be required for different metric plug-ins 6, 14, 11. Deep Neural Network (DNN) plugins 7, particularly for the at least one selected perception function 33 of the application 31, for example, use DNNs from the memory for DNNs 69 and can execute them on computer resources 70, which can require a GPU. In particular, there are plugins 76 for controlling the tool 52 for synthetic data 5, wherein the tool 52 is executed on respective computer resources 71 for the tool 52. With this plugin 76, the evaluation unit 111 can automatically vary and optimize the parameters of the tool 52 for synthetic data 5 to generate better synthetic data 5, or specific cases needed, and to improve the tool 52.

For an application definition 74, applications and all attributes of the application management can be defined by the data consumer 30 via the interfaces 21, 22, 23, 24, which are represented as elements of the user interfaces 60-62. The elements 31-37 of the application definition 74 were represented in FIG. 3 shortened to 31-37 for clarity. The users 75, or cooperation partners, can read and, if necessary, edit this data via the evaluation unit 111. The applications are preferably stored in the application registry 67.

Via the user interfaces 60-62, the users 75, or cooperation partners, can evaluate the quality of the synthetic data 5 or the synthetic data tool 52, with the evaluation component 1 of the evaluation unit 111. Individual image pairs or sets of images can be selected and evaluated, or the evaluation component 1 automatically calls the synthetic data generation tool 52 with the aid of the plugin 76 and optimizes the data generation parameters. The results 12 of the metrics plugins 6, 14, 11 are in particular stored in the memory for evaluation data 68 in relation to the application and all variation parameters. The results and visualization plugin 13 preferably stores data in the memory 68 and can permit visualization via the user interfaces 60-62.

Figure 4:
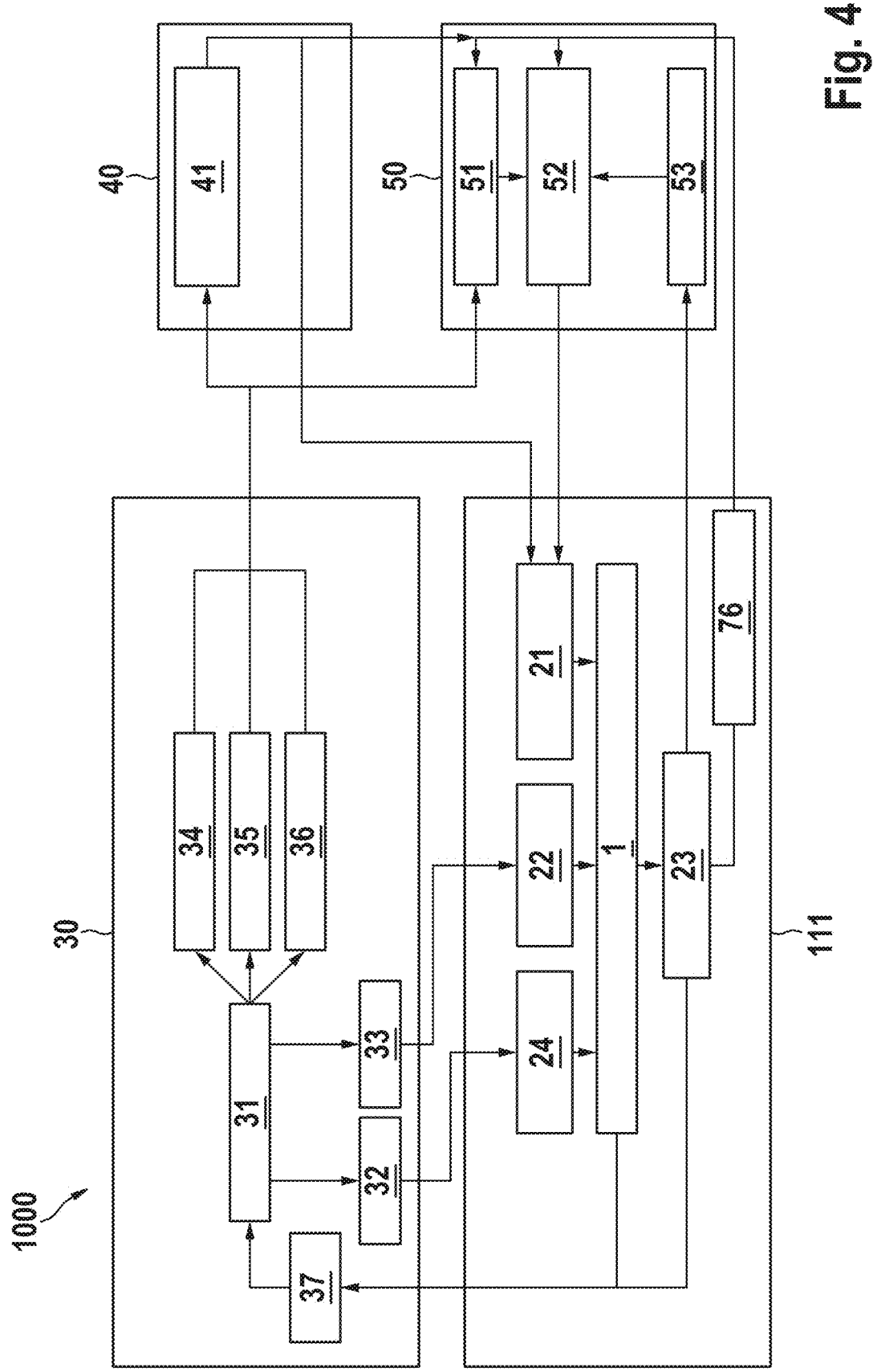

FIG. 4 shows an example of the various user roles, or instances 30, 40, 50, for persons or organizations, and how they interact with each other with the aid of the evaluation unit 111. A person or organization can serve several of these roles, or instances 30, 40, 50, as appropriate. Other interaction flows are also possible.

A data consumer & application manager 30 preferably defines the application 31. This includes, in particular, the selection 33 of the DNNs or computer vision or perception functions 7 (based on the available DNNs in DNNs memory 69 that can be used by DNN plugins) and the selection 32 of metrics based on the available plugins 6, 14, 11. Furthermore, for example, the requirements 34 of the application 31 are recorded and these are agreed with a reference data supplier 40 and a synthetic data and/or tool supplier 50. Further data 35, e.g., already existing measurement data such as drone images or light samples, and, if necessary, camera or other hardware 36 can be provided. This information is in particular recorded via the interfaces 21, 22, 24 of the user interfaces 60-62 of the evaluation unit 111 and can be provided to the users 75 via their instantiated evaluation unit 111. This information can help differentiate and organize the applications 31.

The role of reference data supplier 40 can be realized multiple times, and can also overlap with the data consumer & application manager 30 or the synthetic data and/or tool supplier 50. In this role, in particular, real reference data 4 is recorded for comparison with synthetic data 5 from a sensor 41 and provided via the interface 21 of the evaluation component for evaluations. For the user, the interface 21 is depicted in particular in the context of user interfaces 60-62; in technical terms, the interface for the data can be realized via the data plugin 2. The data can be stored in memory for reference data 66. The memory can be located in a location that is local to some users 75, or rolls 30, 40, 50, and external to others.

In particular, the synthetic data and/or tool supplier 50 uses the information from the application 31 and the additional data 35 for modeling 51. The data generation tool 52 and the modeling 51 can be different. When using classical 3D rendering tools, e.g. 3D models and materials (textures) are created. When using augmentation tools, modeling consists in particular of programming the augmentation procedures and setting their parameters. When using DNN-based approaches, e.g., NeRFs, GANs, diffusion meshes, etc., the DNNs in particular are trained. Training data can be required and the programming and parameterization of these tools is adjusted.

The synthetic data and/or tool supplier 50 now preferably uses the evaluation component 1 to evaluate its synthetic data 5 with respect to the real reference data 4 and to obtain quick feedback 53. The evaluation takes place with respect to the selected DNNs and metrics of the application 31. The result and visualization plugin 13, in particular, calculates the results 12, stores and visualizes the results, and maps them via the result and visualization interface 23 of the user interfaces 60-62. For example, results 12 are stored in the memory for evaluation data 68 in the context of application 31 and all variation parameters.

The synthetic data and/or tool supplier 50 can utilize feedback 53 to improve its data generation tool 52. It has the option to request measurement data from reference data supplier 40 for modeling 51 (e.g., 3D modeling, tool programming, or DNN training) as needed. If necessary the roles of synthetic data and/or tooling supplier 50 and reference data supplier 40 can overlap. The synthetic data and/or tool supplier 50 can thus optimize its tool 52 and its work steps independent of the data consumer & application case manager 30. If parameters of the data generation tool 52 are to be automatically optimized, an optimizer 76 can be used that varies the parameters of the tool 52 and automatically executes the tool via the optimizer & tool control plugin 76 on the designated computer resources 71.

The data consumer & application manager 30 and the synthetic data and/or tool supplier 50 are preferably in exchange and use the results and visualization interface 23 of the evaluation unit 111 as the basis for discussion for cooperation. The data consumer & use case manager 30 can use these results to evaluate the usability 37 of the synthetic data 5 and, if necessary, adjust the application 31.

A possible goal of this method of operation is not just to generate qualified synthetic data 5 once. The synthetic data and/or tool supplier 50 can advantageously improve its work steps, the required additional data 35, and its tools 52 to continue to provide high quality synthetic data 5 in a cost-effective manner in the future. The requirements for the reference data supplier 40 and the work steps can be optimized with it. The data consumer & application manager 30 can establish a structured method of operation and thus enable the required synthetic data 5 and tools 52 to be evaluated and requirements 34 defined.

The above explanation of the embodiments describes the present disclosure solely within the scope of examples. Of course, individual features of the embodiments can be freely combined with one another, if technically feasible, without leaving the scope of the present disclosure.

What is claimed is:

1. A method for ensuring a quality of synthetic data for at least one perception function using a distributed system, the method comprising:
    providing at least one interface of the distributed system configured to provide access from at least two instances of the distributed system to an evaluation component of the distributed system by the at least one interface;
    determining, with one of the at least two instances of the distributed system, a description of a target application including at least one perception function to be performed with respect to the synthetic data, a description of the synthetic data to be generated, and at least one metric for evaluating the quality of the synthetic data;
    generating the synthetic data based on the description of the target application with the one or another of the at least two instances of the distributed system;
    receiving, with the evaluation component, via the at least one interface, the description of the target application and the synthetic data;
    evaluating the synthetic data with respect to reference data using the at least one metric by the evaluation component of the distributed system to ensure the quality of the synthetic data; and
    adjusting the generation of the synthetic data, with the one or another of the at least two instances of the distributed system, based on a result of the evaluation.

2. The method according to claim 1, wherein adjusting the generation, comprises:
    varying at least one parameter of a tool that was used to generate the synthetic data, and
    generating the synthetic data based on the description of the target application using the tool.

3. The method according to claim 1, wherein the evaluation comprises:
    comparing a similarity between the synthetic data and the reference data to provide a first metric of the at least one metric.

4. The method according to claim 1, wherein the evaluation comprises:
    performing the at least one perception function with respect to the synthetic data and the reference data, and
    comparing results of the performing the at least one perception function to provide a second metric of the at least one metric.

5. The method according to claim 1, wherein communication between the at least two instances and/or a configuration of the target application and/or the at least one perception function and/or the at least one metric is provided through the at least one interface.

6. The method according to claim 1, wherein the at least one of:
    the synthetic data are generated by simulating sensor data;
    the reference data include a measurements of at least one sensor; and
    the at least one perception function is an image classification function of a machine learning model.

7. The method according to claim 1, wherein the method is performed by executing a computer program on at least one computer.

8. A device for data processing, the device comprising:
    a processor configured to carry out the method according to claim 1.

9. A non-transitory computer-readable storage medium, comprising instructions which, when executed by a computer, cause it to carry out the method according to claim 1.

\* \* \* \* \*